United States Patent
Liang et al.

(10) Patent No.: US 11,062,699 B2
(45) Date of Patent: Jul. 13, 2021

(54) SPEECH RECOGNITION WITH TRAINED GMM-HMM AND LSTM MODELS

(71) Applicant: PING AN TECHNOLOGY(SHENZHEN) CO., LTD., Shenzhen (CN)

(72) Inventors: Hao Liang, Shenzhen (CN); Jianzong Wang, Shenzhen (CN); Ning Cheng, Shenzhen (CN); Jing Xiao, Shenzhen (CN)

(73) Assignee: PING AN TECHNOLOGY (SHENZHEN) CO., LTD., Shenzhen Guangdong (CN)

( * ) Notice: Subject to any disclaimer, the term of this patent is extended or adjusted under 35 U.S.C. 154(b) by 182 days.

(21) Appl. No.: 16/348,807

(22) PCT Filed: Aug. 31, 2017

(86) PCT No.: PCT/CN2017/100043
§ 371 (c)(1),
(2) Date: May 9, 2019

(87) PCT Pub. No.: WO2018/227780
PCT Pub. Date: Dec. 20, 2018

(65) Prior Publication Data
US 2019/0266998 A1    Aug. 29, 2019

(30) Foreign Application Priority Data
Jun. 12, 2017   (CN) .......................... 201710445076.9

(51) Int. Cl.
*G10L 15/00*    (2013.01)
*G10L 15/20*    (2006.01)
(Continued)

(52) U.S. Cl.
CPC .............. *G10L 15/14* (2013.01); *G06F 17/16* (2013.01); *G06F 17/18* (2013.01); *G06N 3/08* (2013.01); *G10L 15/02* (2013.01); *G10L 15/16* (2013.01)

(58) Field of Classification Search
CPC ......... G10L 15/02; G10L 15/16; G10L 15/14; G10L 15/142; G10L 2015/025;
(Continued)

(56) References Cited

U.S. PATENT DOCUMENTS 6,456,697 B1 *   9/2002   Chang ..................... G10L 15/20
                                                              379/201.01
2002/0198706 A1    12/2002   Kao et al.
(Continued)

FOREIGN PATENT DOCUMENTS

CN   104538028 A   4/2015
CN   105513591 A   4/2016
(Continued)

OTHER PUBLICATIONS

Mohamed, "Deep neural network acoustic models for ASR", 2014, (Doctoral dissertation).201, pp. 1-129.*
(Continued)

*Primary Examiner* — Olujimi A Adesanya
(74) *Attorney, Agent, or Firm* — Dorsey & Whitney LLP

(57) ABSTRACT

A speech recognition method, comprising: acquiring speech data to be recognized; extracting a Filter Bank feature and a Mel-Frequency Cepstral Coefficient (MFCC) feature in the speech data; using the MFCC feature as input data of a trained Gaussian Mixture Model-Hidden Markov Model (GMM-HMM) model, acquiring a first likelihood probability matrix outputted by the trained GMM-HMM model; using the Filter Bank feature as an input feature of a trained long short-term memory (LSTM) model which has a con-
(Continued)

nection unit, acquiring a posterior probability matrix outputted by the LSTM model; using the posterior probability matrix and the first likelihood probability matrix as input data of a trained HMM model, acquiring an second likelihood probability matrix; and acquiring a target word sequence corresponding to the speech data to be recognized from a phoneme decoding network according to the second likelihood probability matrix.

15 Claims, 8 Drawing Sheets

(51) Int. Cl.
  *G10L 17/00* (2013.01)
  *G10L 15/14* (2006.01)
  *G06F 17/16* (2006.01)
  *G06F 17/18* (2006.01)
  *G06N 3/08* (2006.01)
  *G10L 15/16* (2006.01)
  *G10L 15/02* (2006.01)

(58) Field of Classification Search
  CPC ...... G06N 3/02; G06N 3/0445; G06N 3/0454; G06N 3/08; G06N 7/005; G06F 17/16
  See application file for complete search history.

(56) References Cited

U.S. PATENT DOCUMENTS

| | | |
|---|---|---|
| 2004/0148160 A1 | 7/2004 | Ramabadran |
| 2014/0257804 A1* | 9/2014 | Li .......................... G10L 15/16 704/232 |
| 2015/0161522 A1* | 6/2015 | Saon .................... G06N 3/0454 706/12 |
| 2017/0161256 A1 | 6/2017 | Hori et al. |
| 2018/0005107 A1* | 1/2018 | Neil ........................ G06F 15/82 |
| 2018/0129937 A1* | 5/2018 | Bradbury ................ G06N 3/04 |

FOREIGN PATENT DOCUMENTS

| | | |
|---|---|---|
| CN | 105679316 A | 6/2016 |
| CN | 105810192 A | 7/2016 |
| CN | 105810193 A | 7/2016 |
| CN | 105869624 A | 8/2016 |
| CN | 105976812 A | 9/2016 |
| CN | 106328122 A | 1/2017 |
| JP | 20110107650 A | 6/2011 |
| KR | 1020080049385 A | 6/2008 |

OTHER PUBLICATIONS

Karpagavalli et al, "Phoneme and word based model fortamil speech recognition using GMM-HMM", 2015, In 2015 International Conference on Advanced Computing and Communication Systems Jan. 5, 2015 (pp. 1-5). IEEE.*

International Search Report from International Application No. PCT/CN2017/100043 dated Mar. 15, 2018.

Guangxu, et al., "Long short term memory recurrent neural network acoustic models using I-vector for low resource speech recognition", Application Research of Computers, 6 pages.

Xue-Feng, et al., "A Survey on Deep Learning for Natural Language Processing", 21 pages.

Zhihui, et al., "Sequence labeling Chinese word segmentation method based LSTM networks", 6 pages.

* cited by examiner

US 11,062,699 B2

SPEECH RECOGNITION WITH TRAINED GMM-HMM AND LSTM MODELS

This application is a U.S. National Stage of PCT International Application No. PCT/CN2017/100043 filed on Aug. 31, 2017, which claims priority to Chinese patent application No. 2017104450769 entitled "Method and Apparatus for Speech Recognition, Computing Device and Storage Medium", and filed on Jun. 12, 2017, the disclosure of each of which is herein incorporated in its entirety by reference.

TECHNICAL FIELD

The present disclosure relates generally to the field of computer processing, and more particularly, to a method for speech recognition, a computing device, and a storage medium.

BACKGROUND

Speech recognition, also known as automatic speech recognition (ASR), aims to allow a machine to recognize and understand speech signals, and to convert the speech signals into text, which is an important branch of the development of modern artificial intelligence. The realization of speech recognition technology is the premise of natural language processing, and can effectively promote the development of voice-controlled interaction and related fields and greatly facilitate people's lives, such as smart home, and speech input. The accuracy of speech recognition directly determines the application effectiveness of this technology.

The traditional speech recognition technology generally creates an acoustic model based on GMM-HMM (mixed Gaussian model and hidden Markov model). In recent years, with the development of deep learning technology, the acoustic model created based on DNN-HMM (deep learning model and hidden Markov Model) has a greatly improved accuracy of recognition than the acoustic model created based on GMM-HMM, but it still needs to further improve the accuracy of speech recognition.

SUMMARY

According to various embodiments of the present disclosure, a method for speech recognition, a computing device, and a storage medium are provided.

A method for speech recognition includes:
acquiring speech data to be recognized;
extracting a Filter Bank feature and a MFCC feature in the speech data;
using the MFCC feature as input data of a trained GMM-HMM model, and acquiring a first likelihood probability matrix output by the trained GMM-HMM model;
using the Filter Bank feature as an input feature of a trained LSTM model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

A computing device, including a processor, and a memory storing computer-readable instructions operable to be executed by the processor to cause the processor to perform:
acquiring speech data to be recognized;
extracting a Filter Bank feature and a MFCC feature in the speech data;
using the MFCC feature as input data of a trained GMM-HMM model, and acquiring a first likelihood probability matrix output by the trained GMM-HMM model;
using the Filter Bank feature as an input feature of a trained LSTM model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

One or more non-transitory readable storage mediums storing computer readable instructions operable to be executed by one or more processors to cause the one or more processors to perform:
acquiring speech data to be recognized;
extracting a Filter Bank feature and a MFCC feature in the speech data;
using the MFCC feature as input data of a trained GMM-HMM model, and acquiring a first likelihood probability matrix output by the trained GMM-HMM model;
using the Filter Bank feature as an input feature of a trained LSTM model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

The details of one or more embodiments of present disclosure are set forth in the accompanying drawings and the description below. Other potential features, objects, and advantages of the present disclosure will become apparent from the description, the drawings, and the claims.

DESCRIPTION OF THE DRAWINGS

To illustrate the technical solutions in the embodiments of present disclosure more clearly, the accompanying drawings for describing the embodiments are introduced briefly in the following. Apparently, the accompanying drawings in the following description are only some embodiments of present disclosure, and persons of ordinary skill in the art can derive other drawings from the accompanying drawings without creative efforts.

DETAILED DESCRIPTION OF THE EMBODIMENTS

The above and other features of the disclosure including various novel details of construction and combinations of parts, and other advantages, will now be more particularly described with reference to the accompanying drawings and embodiments. It will be understood that the embodiments described herein are shown by way of illustration and not as a limitation of the disclosure.

Figure 1:
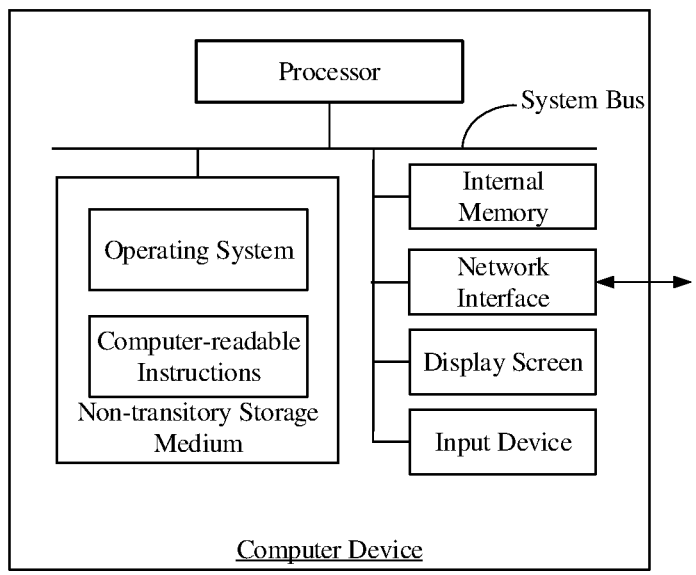
FIG. 1 is a block diagram illustrating an internal configuration of a computing device according to one embodiment.

FIG. 1 is a schematic diagram illustrating an internal configuration of a computing device according to one embodiment. The computing device may be a terminal or a server. As shown in FIG. 1, the computing device includes a processor, a non-volatile storage medium, an internal memory, a network interface, a display screen, and an input device, which are coupled through a system bus. The non-transitory storage medium may store an operating system, and computer-readable instructions which when executed by the processor cause the processor to perform a method for speech recognition. The processor of the computing device is used to provide the capabilities for computing and controlling, which support the operation of the entire computing device. The internal memory may store computer-readable instructions which when executed by the processor cause the processor to perform a method for speech recognition. The network interface of the computing device is used for network communication. The display screen of the computing device may be a liquid crystal display screen or an electronic ink display screen. The input device of the computing device may be a touch layer covered on the display screen, or a button, a trackball or a touchpad provided on the housing of the computing device, or an external keyboard, touchpad or mouse. The touch layer and the display screen form a touch screen. Person skilled in the art can understand that, the configuration shown in FIG. 1 is only a part of the configuration of the computing device related to the solution of present disclosure, which does not impose limitation to the computing device. Specifically, the computing device can include more or less components than those shown in the drawing, or can combine some components, or can have a different component deployment.

Figure 2:
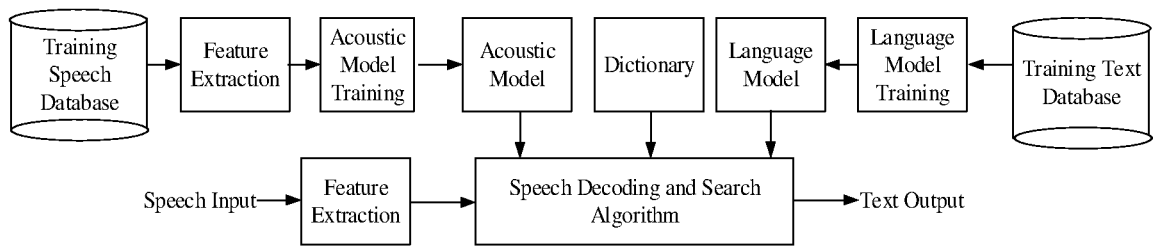
FIG. 2 is an architectural diagram illustrating speech recognition according to one embodiment.

Firstly, a framework of the speech recognition is introduced. As shown in FIG. 2, the speech recognition mainly includes two parts: an acoustic model and a language model, which are combined with a dictionary to form the framework of the speech recognition. The process of the speech recognition is a process of converting an input speech feature sequence into a character sequence based on the dictionary, the acoustic model and the language model. The role of the acoustic model is to obtain mappings between phonetic features and phonemes; the role of the language model is to obtain mappings between words and words and mappings between words and sentences. The role of the dictionary is to obtain mappings between words and phonemes. Specifically, the process of the speech recognition may be divided into three steps. In the first step, the speech frame is recognized as a phoneme state, that is, aligning the speech frame and the phoneme state. The second step is to combine a phoneme based on the phoneme state. The third step is to combine the phonemes into a word. The first step is the role of the acoustic model, which is both important and difficult. The more accurate the alignment of the speech frame and the phoneme state is, the better the speech recognition effect will be. A phoneme state is a phonetic unit more detailed than a phoneme, and one phoneme is generally composed of 3 phoneme states.

Figure 3:
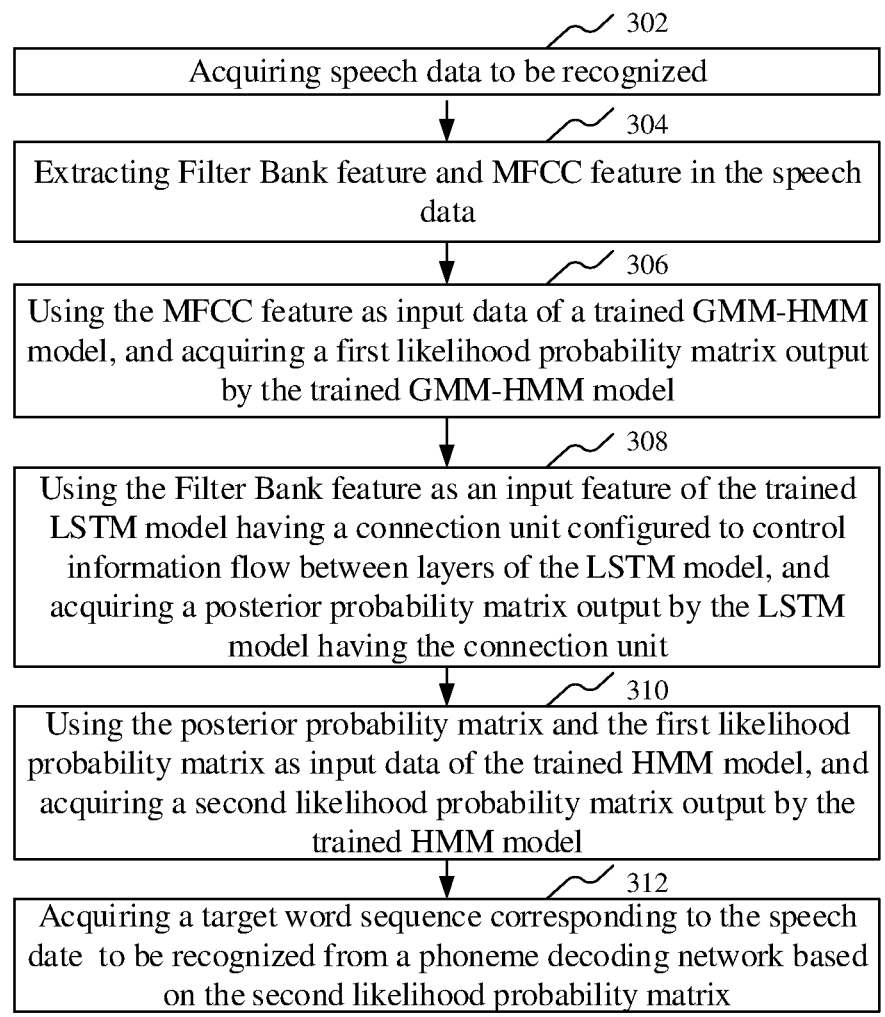
FIG. 3 is a flow diagram illustrating a method for speech recognition according to one embodiment.

As shown in FIG. 3, in one embodiment, a method for speech recognition is provided. The method may be applied to a terminal or a server, and specifically include the following steps.

At step 302, speech data to be recognized is acquired.

In this embodiment, the speech data to be recognized herein is generally audio data, including digital audio and text audio, input by users, which is obtained through interactive application.

At step 304, a Filter Bank feature and a MFCC feature in the speech data may be extracted.

In this embodiment, each of the Filter Bank feature and the MFCC (Mel Frequency Cepstrum Coefficient) feature is a parameter used to represent a speech feature in the speech recognition. The Filter Bank is used for a deep learning model, and MFCC is used for a mixing Gaussian model. Before extracting the Filter Bank feature and the MFCC feature in the speech data, the speech data is generally required to be preprocessed. Specifically, the input speech data is first pre-emphasized, and a high-pass filter is used to boost the high-frequency part of the speech signal so as to make the spectrum smoother. Then the pre-emphasized speech data is subjected to frame-by-frame windowing, so that the non-stationary speech data is converted into a short-term stationary signal. Then the speech and noise are distinguished by endpoint detection, and an effective speech portion is extracted. In order to extract the Filter Bank feature and the MFCC feature in the speech data, the preprocessed speech data is first subjected to a fast Fourier transformation so that the speech signal in a time domain is converted to the energy spectrum in a frequency domain for analysis. Then the energy spectrum passes through a set of Mel-scale triangular filter banks, so the format features of the speech are highlighted. Then the logarithmic energy of each filter bank output is calculated. The feature output by the filter bank is the Filter Bank feature. Furthermore, the calculated logarithm energy is subjected to discrete cosine transformation to obtain MFCC coefficient, that is, MFCC feature.

At step 306, the MFCC feature is used as input data of a trained GMM-HMM model, and a first likelihood probability matrix output by the trained GMM-HMM model is acquired.

$$f(\overset{r}{x}|\overset{r}{\mu}, D) = \frac{1}{(2\pi)^{K/2}|D|^{1/2}} \exp\left(-\frac{1}{2}(x-\mu)^T(x-\mu)^T D^{-1}(x-\mu)\right)$$

In this embodiment, the acoustic model cooperates with the language model to realize the recognition of the speech. The role of the acoustic model is to identify the alignment relationship between speech frames and phoneme states. The GMM-HMM model is a part of the acoustic model and is used to initially align speech frames with phoneme states. Specifically, the MFCC feature of the extracted speech data to be recognized is used as the input data of the trained GMM-HMM model, and the likelihood probability matrix output by the model is acquired. For the convenience of subsequent distinction, the likelihood probability matrix output by the model is referred to as "first likelihood probability matrix". The likelihood probability matrix represents the alignment relationship between the speech frame and the phoneme state, that is, the alignment relationship between the speech frame and the phoneme state can be obtained based on the likelihood probability matrix obtained by calculation. However, the alignment relationship obtained through GMM-HMM training is not very accurate. Then herein an initial alignment of the speech frame and the phoneme state is performed by the first likelihood probability matrix. The specific calculation formula of the GMM model is as follows:

$$f(\overset{r}{x}|\overset{r}{\mu}, D) = \frac{1}{(2\pi)^{K/2}|D|^{1/2}} \exp\left(-\frac{1}{2}(x-\mu)^T(x-\mu)^T D^{-1}(x-\mu)\right),$$

where x represents the extracted speech feature (MFCC) vector, μ and D are the mean value and variance matrix respectively, and K represents the order of the MFCC coefficient.

At step 308, the Filter Bank feature is used as an input feature of a trained LSTM model having a connection unit configured to control information flow between layers of the LSTM model, and a posterior probability matrix output by the LSTM model having the connection unit is acquired.

In this embodiment, the LSTM model belongs to the deep learning model and also belongs to a part of the acoustic model. The LSTM model having the connection unit is an innovative model based on the traditional LSTM model. This model adds a connection unit between the layers of the traditional LSTM model and the connection unit controls the information flow between the layers. Thanks to the connection unit, effective information filtering can be achieved, and the LSTM model can have a deeper training level, and more training levels, to obtain a better feature expression and a better recognition effect. Therefore, the LSTM model having the connection unit can not only improve the speed of the speech recognition, but also improve the accuracy of speech recognition. Specifically, the connection unit is implemented by a sigmoid function. The principle is that an output of a previous layer is controlled to flow into a latter layer by a threshold formed by the sigmoid function, that is, the output is used as the input of the latter layer of the LSTM network. The value of this sigmoid function is determined together by the state of the previous layer of neural nodes, the output of the previous layer of neural nodes, and the input of the latter layer of neural nodes. The neural node is responsible for the computational expression of the neural network model. Each node contains some calculation relations. These calculation relations can be understood as a kind of calculation formula, which can be the same or not. The number of neural nodes in each layer of LSTM is determined by the frames number of the feature input and the feature vectors. For example, if continuous 5 frames are pieced together for input, there are 11 input vectors in total. And the corresponding feature vector of each frame is determined by the extracted speech feature, for example, if the extracted Filter Bank feature is an 83-dimensional feature vector, then the corresponding neural nodes in the trained LSTM model are 11×83=913.

At step 310, the posterior probability matrix and the first likelihood probability matrix are used as input data of the trained HMM model, and a second likelihood probability matrix output by the trained HMM model is acquired.

In this embodiment, the HMM (Hidden Markov Model) model is a statistical model that is used to describe a Markov process with an implicitly unknown parameter. The purpose is to determine the implicit parameter in the process from observable parameters. The HMM model mainly involves five parameters, which are two state sets and three probability sets. The two state sets are a hidden state and an observed state respectively, and the three probability sets are an initial matrix, a transfer matrix and a confusion matrix. The transfer matrix is obtained by training, that is, once the training of the HMM model is completed, the transfer matrix is determined. In this embodiment, the observable speech feature (Filter Bank feature) is mainly used as an observation state to calculate and determine a corresponding relation (i.e., an implicit state) between the phoneme state and the speech frame. In order to determine the corresponding relation between phoneme states and speech frames, it also needs to determine two parameters, that is, the initial matrix and the confusion matrix. The posterior probability matrix calculated by the LSTM model having the connection unit is the confusion matrix that needs to be determined in the HMM model, and the first likelihood probability matrix is the initial matrix that needs to be determined. Therefore, by using the posterior probability matrix and the first likelihood probability matrix as the input data of the trained HMM model, a second likelihood probability matrix output by the trained HMM model can be obtained. The second likelihood probability matrix represents the final alignment relationship between phoneme state and speech frame. Then, based on the determined second likelihood probability matrix, a target word sequence corresponding to the speech data to be recognized can be acquired in the phoneme decoding network.

At step 312, a target word sequence corresponding to the speech date to be recognized is acquired from a phoneme decoding network based on the second likelihood probability matrix.

In this embodiment, the process of the speech recognition includes two parts, in which one is an acoustic model and the other is a language model. Before recognizing the speech, a phoneme-level decoding network needs to be built firstly based on the trained acoustic model, the trained language model and the dictionary. And an optimal route in the network could be found based on a search algorithm. The search algorithm may be Viterbi algorithm. This route is capable to output a word string corresponding to the speech data with the greatest probability, so that the text contained in this speech data is determined. The decoding network at the phoneme decoding level (i.e., the phoneme decoding network) is implemented by the correlation algorithm of the Finite State Transducer (FST), such as determination algorithm and minimization algorithm. By splitting a sentence into words, and splitting a word into phonemes (such as Chinese syllables and English phonetic symbols), the phoneme, pronunciation vocabulary, grammar, and etc. are aligned and calculated through above method, then a phoneme decoding network output by the method is obtained. The phoneme decoding network contains all possible route expressions. The decoding process is to cut the route of the huge network based on the speech data input, and then one or more candidate routes are obtained. These routes are stored in the data structure of a word network. The last recognition is to rate the candidate routes, and the route with the highest score is the recognition result.

In this embodiment, by combining the Gaussian model GMM and the long-short recursive neural network LSTM in the deep learning model for speech recognition, the first likelihood probability matrix is firstly calculated by the GMM-HMM model based on the extracted MFCC feature. The first likelihood probability matrix represents the alignment result of the phonetic data at the phoneme state. Then based on the previous preliminary alignment result, the further alignment is implemented by the LSTM. And the LSTM uses an innovative LSTM model having the connection unit. The model adds connection unit between the layers of the traditional LSTM model, so that the connection unit can control the information flow between the layers. With this connection unit, it can achieve effective information screening. So that it cannot only increase the speed of recognition, but also improve the accuracy of the recognition.

Figure 4:
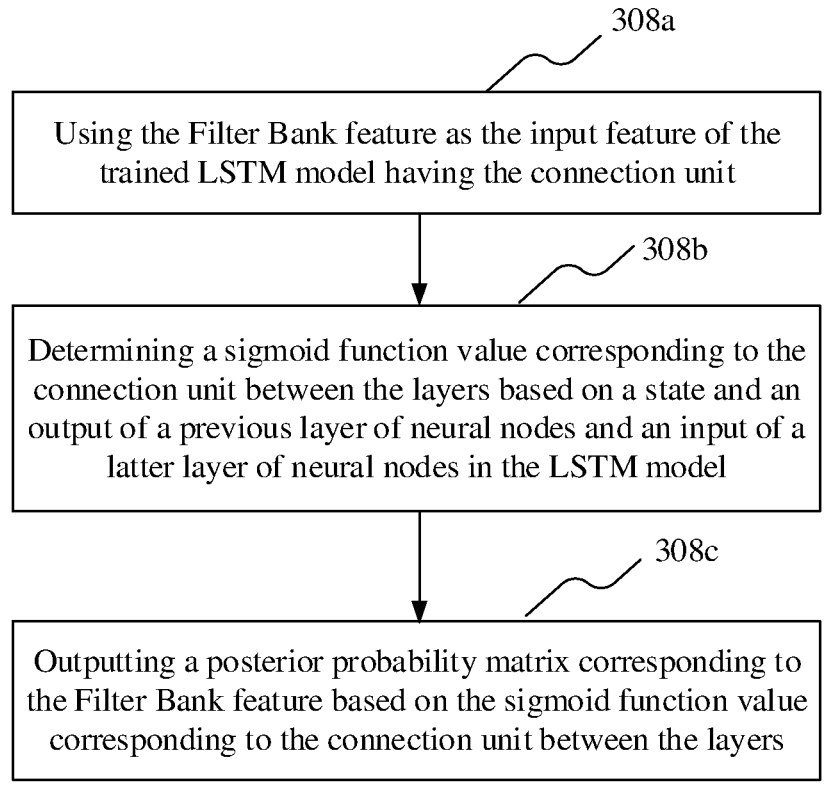
FIG. 4 is a flow diagram illustrating a method for acquiring a posterior probability matrix with a LSTM model having a connection unit according to one embodiment.

As shown in FIG. 4, in one embodiment, the connection unit is implemented by a sigmoid function. The Filter Bank feature is used as an input feature of the trained LSTM model having the connection unit, and a posterior probability matrix output by the LSTM model having the connection unit is acquired. The connection unit is used to control the information flow between the layers in the LSTM model. The method includes the following steps.

At step 308a, the Filter Bank feature is used as the input feature of the trained LSTM model having the connection unit.

At step 308b, a sigmoid function value corresponding to the connection unit between the layers is determined based on a state and an output of a previous layer of neural nodes and an input of a latter layer of neural nodes in the LSTM model.

At step 308c, a posterior probability matrix corresponding to the Filter Bank feature is output based on the sigmoid function value corresponding to the connection unit between the layers.

In this embodiment, the connection unit is implemented by the sigmoid function. In the LSTM model, the information flow between the layers is controlled by the sigmoid function. For example, it controls whether the information flows or the amount it flows. The determination of the function value corresponding to the sigmoid function is determined by the state of the previous layer of neural nodes, the output of the previous layer of neural nodes, and the input of the latter layer of neural nodes. Specifically, the sigmoid function is expressed as: $\sigma(x)=1/(1+e^{-x})$, $d_t^{l+1}=\sigma(b^{l+1}+W_x^{l+1}X_t^{l+1}+W_c^{l+1} e\ c_t^{l+1}+W_l^{l+1}\ e\ c_t^{l})$, where X represents an input of the connection unit in the layer, t represents a time t, d represents an output of the connection unit, l represents a previous layer of the connection unit, l+l represents a latter layer of the connection unit, b represents a bias item, and W represents a weight matrix. Thereinto, $W_x$ is an input-related weight matrix, $W_c$ is an output-related weight matrix, $W_l$ is a layer-related weight matrix, c represents an output of the LSTM output control gate. The LSTM has tree threshold controls including an input control gate, a forgotten control gate, and an output control gate. The output control gate is used to control the output flow of the neural node. e is an operator that multiplies the elements corresponding to the two matrix. The bias item b and the value of weight matrix W have been determined once the model has completed the training. The amount of the information flowing between layers can thus be determined based on the input. Then once the information flowing between the layers is determined, a posterior probability matrix output by the model can be acquired, which is corresponding to the Filter Bank feature.

Figure 5:
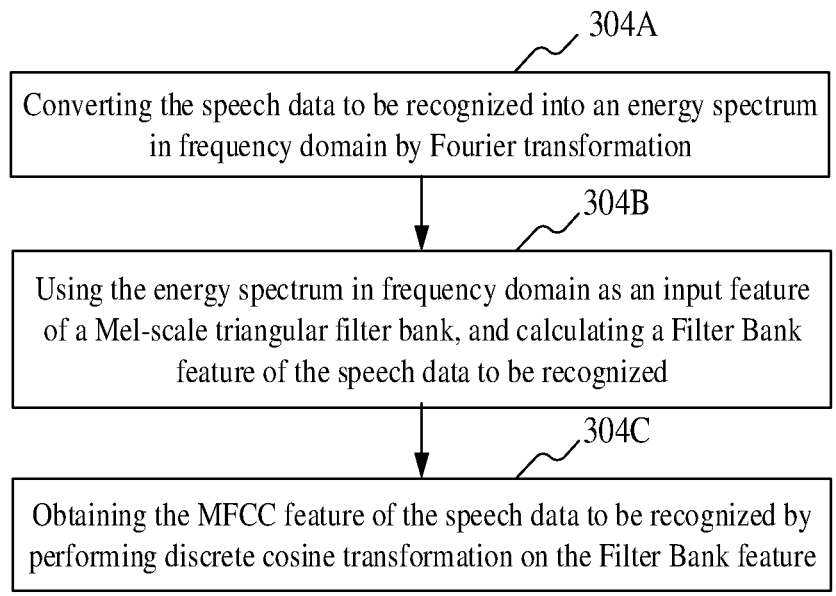
FIG. 5 is a flow diagram illustrating a method for extracting a Filter Bank feature and a MFCC feature in speech data according to one embodiment.

As shown in FIG. 5, in one embodiment, the step 304 of extracting the Filter Bank feature and MFCC feature in the speech data includes the following steps.

At step 304A, the speech data to be recognized is converted into an energy spectrum in frequency domain by Fourier transformation.

In this embodiment, since it is difficult to see the characteristic of the speech signal from the change of the speech signal in time domain, it is generally required to convert the characteristic of the speech signal into an energy distribution in frequency domain to observe. Different energy distributions represent different speech characteristics. Therefore, the speech data to be recognized needs to undergo fast Fourier transform to obtain the energy distribution on the spectrum. The spectrum of each frame is obtained by a fast Fourier transformation of each frame of speech signal, and the power spectrum (i.e., energy spectrum) of the speech signal is obtained by a modular square of the spectrum of the speech signal.

At step 304B, the energy spectrum in frequency domain is used as an input feature of a Mel-scale triangular filter bank, and the Filter Bank feature of the speech data to be recognized is calculated.

In this embodiment, in order to obtain the Filter Bank feature of the speech data to be recognized, the obtained energy spectrum in frequency domain needs to be taken as the input feature of the Mel-scale triangular filter bank to calculate the logarithm energy output from each triangular filter bank, that is, to obtain the Filter Bank feature of speech data to be recognized. The energy spectrum corresponding to each frame of speech signals is used as the input feature of the Mel-scale triangular filter bank, and then the Filter Bank feature corresponding to each frame of speech signals is acquired.

At step 304C, the MFCC feature of the speech data to be recognized is obtained by performing discrete cosine transformation on the Filter Bank feature.

In this embodiment, in order to obtain the MFCC feature of the speech data to be recognized, the logarithmic energy output by the filter bank needs to be discrete cosine transformed to obtain the corresponding MFCC feature. The MFCC feature corresponding to each frame of speech signals is obtained by discrete cosine transformation of the Filter Bank feature corresponding to speech signal of each frame. The difference between Filter Bank feature and MFCC feature is that the Filter Bank feature has data correlation between different feature dimensions, while the MFCC feature is a feature that obtained by the removal of the data correlation of the Filter Bank feature by discrete cosine transformation.

Figure 6:
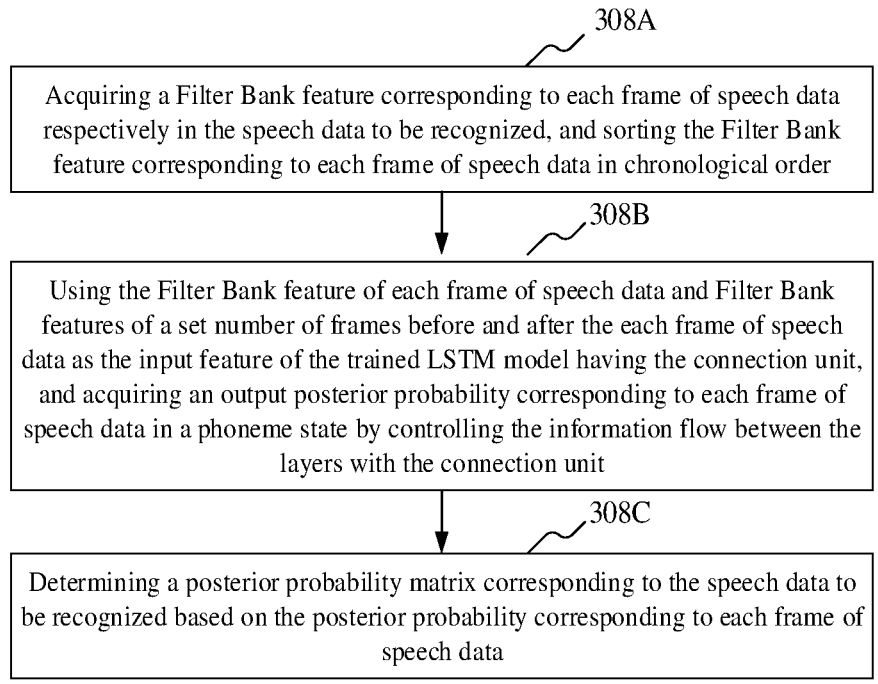
FIG. 6 is a flow diagram illustrating a method for acquiring a posterior probability matrix with a LSTM model having a connection unit according to another embodiment.

As shown in FIG. 6, in one embodiment, the Filter Bank feature is used as an input feature of trained LSTM model having the connection unit. The step 308 of using the Filter Bank feature as the input feature of the trained LSTM model having the connection unit configured to control the information flow between the layers of the LSTM model, and acquiring the posterior probability matrix output by the LSTM model having the connection unit includes the following steps.

At step 308A, a Filter Bank feature corresponding to each frame of speech data in the speech data to be recognized is acquired, and sorted in chronological order.

In this embodiment, when extracting the Filter Bank feature in the speech data to be recognized, the speech data is firstly subjected to framing process, and then the Filter Bank feature corresponding to each frame of speech data is extracted and sorted in chronological order. That is, the Filter Bank features of the frames of speech data are sorted based on the order that these frames appear in the speech data to be recognized.

At step 308B, the Filter Bank feature of each frame of speech data and the Filter Bank features of a set number of frames before and after the each frame of speech data are used as the input feature of trained LSTM model having the connection unit. The connection unit controls the information flow between the layers to acquire an output posterior probability corresponding to each frame of speech data in a phoneme state.

In this embodiment, a multi-frame feature is applied to the input of the deep learning model. It is more advantageous than the traditional mixed Gaussian model with single-frame input, because by splicing the before and after speech frames, it facilitate to acquire the influences of the previous and next frames on the current frame. Therefore, the Filter Bank feature of each frame of speech data and the Filter Bank features of the set number of frames before and after each frame of speech data are generally used as the input feature of trained LSTM model having the connection unit. For example, the current frame is spliced with five frames before and after the current frame, and then a total of 11 frames of data are used as the input feature of the trained LSTM model having the connection unit. The 11-frame speech feature sequence passes through each node in the LSTM model having the connection unit, and then the posterior probability corresponding to the frame speech data in the phoneme state is output.

At step 308C, a posterior probability matrix corresponding to the speech data to be recognized is determined based on the posterior probability corresponding to each frame of speech data.

In this embodiment, after acquiring a posterior probability corresponding to each frame of speech data, a posterior probability matrix corresponding to the speech data to be recognized is determined. The posterior probability matrix is composed of posterior probabilities. Because the LSTM model having the connection unit contains both time dimension information and hierarchical latitude information, comparing to the traditional model, which only has the time dimension information, the LSTM model having the connection unit can obtain the posterior probability matrix corresponding to the speech data to be recognized better.

Figure 7:
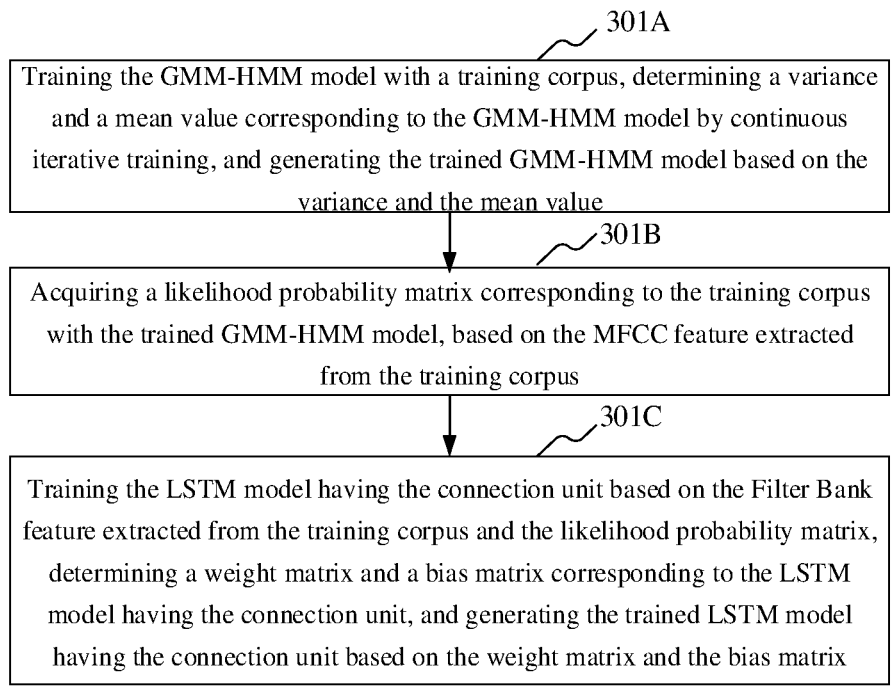
FIG. 7 is a flow diagram illustrating a method for establishing a GMM-HMM model and a LSTM model having a connection unit according to one embodiment.

As shown in FIG. 7, in one embodiment, before the step of acquiring the speech data to be recognized, the method further includes: step 301, establishing a GMM-HMM model and establishing a LSTM model having the connection unit. Specifically, it includes the following steps.

At step 310A, the GMM-HMM model is trained with a training corpora, a variance and a mean value corresponding to the GMM-HMM model is determined by continuous iterative training, and the trained GMM-HMM model is generated based on the variance and mean value.

In this embodiment, the establishment of the GMM-HMM acoustic model employs mono-phoneme training and tri-phoneme training in sequence. The tri-phoneme training considers the influence of the phonemes before and after the current phoneme, so it can achieve a more accurate alignment effect and produce better recognition result. Based on the difference of features and effects, the tri-phoneme training generally employs a tri-phoneme training based on a feature of delta+delta−delta, and a tri-phoneme training of linear discriminant analysis+maximum likelihood linear feature transformation. Specifically, the speech features in the input training corpus are first normalized, and the variance is normalized by default. The normalization of the speech features is to eliminate the deviations caused by convolution noise, such as telephone channels, in feature extraction calculations. Then an initial GMM-HMM model is rapidly obtained using a few feature data, and then the variance and mean value corresponding to the mixed Gauss model GMM-HMM is determined by continuous iterative training. Once the variance and the mean value are determined, the corresponding GMM-HMM model is determined accordingly.

At step 301B, a likelihood probability matrix corresponding to the training corpus is acquired with the trained GMM-HMM model, based on the MFCC feature extracted from the training corpus.

In this embodiment, the training is performed by using the speech data in the training corpus to extract the MFCC feature of the speech in the training corpus. Then the MFCC feature is used as the input feature of the above trained GMM-HMM model to obtain the likelihood probability matrix corresponding to the speech in the training corpus output by the GMM-HM model. The likelihood probability matrix represents an alignment relationship between speech frames and phoneme states. The purpose of outputting the likelihood probability matrix by the trained GMM-HMM model is to use the likelihood probability matrix as an initial alignment relationship for subsequently training the deep learning model, which facilitates the subsequent deep learning model to obtain a better deep learning result.

At step 301C, the LSTM model having the connection unit is trained based on the Filter Bank feature extracted from the training corpus and the likelihood probability matrix, a weight matrix and a bias matrix corresponding to the LSTM model having the connection unit is determined, and the trained LSTM model having the connection unit is generated based on the weight matrix and the bias matrix.

In this embodiment, the alignment result (i.e., the likelihood probability matrix) calculated by the GMM-HMM model and the original speech feature are trained together as the input features of the LSTM model having the connection unit. Comparing to the MFCC feature, the Filter Bank feature used by the original speech feature has a data correlation, so it's better for the speech feature expression. By training the LSTM model having the connection unit, the weight matrix and bias matrix corresponding to each layer of LSTM are determined. Specifically, the LSTM model having the connection unit is a kind of the deep neural network models. Generally, there are three kinds of neural network layers including an input layer, a hidden layer and an output layer, where the hidden layer has multiple layers. The purpose of training the LSTM model having the connection unit is to determine all of the weight matrixes and bias matrixes in each layer and a number of the layer. The training algorithm may be an existing algorithm, such as forward propagation algorithm and Viterbi algorithm or the like. There is no limitation to the specific training algorithm.

Figure 8:
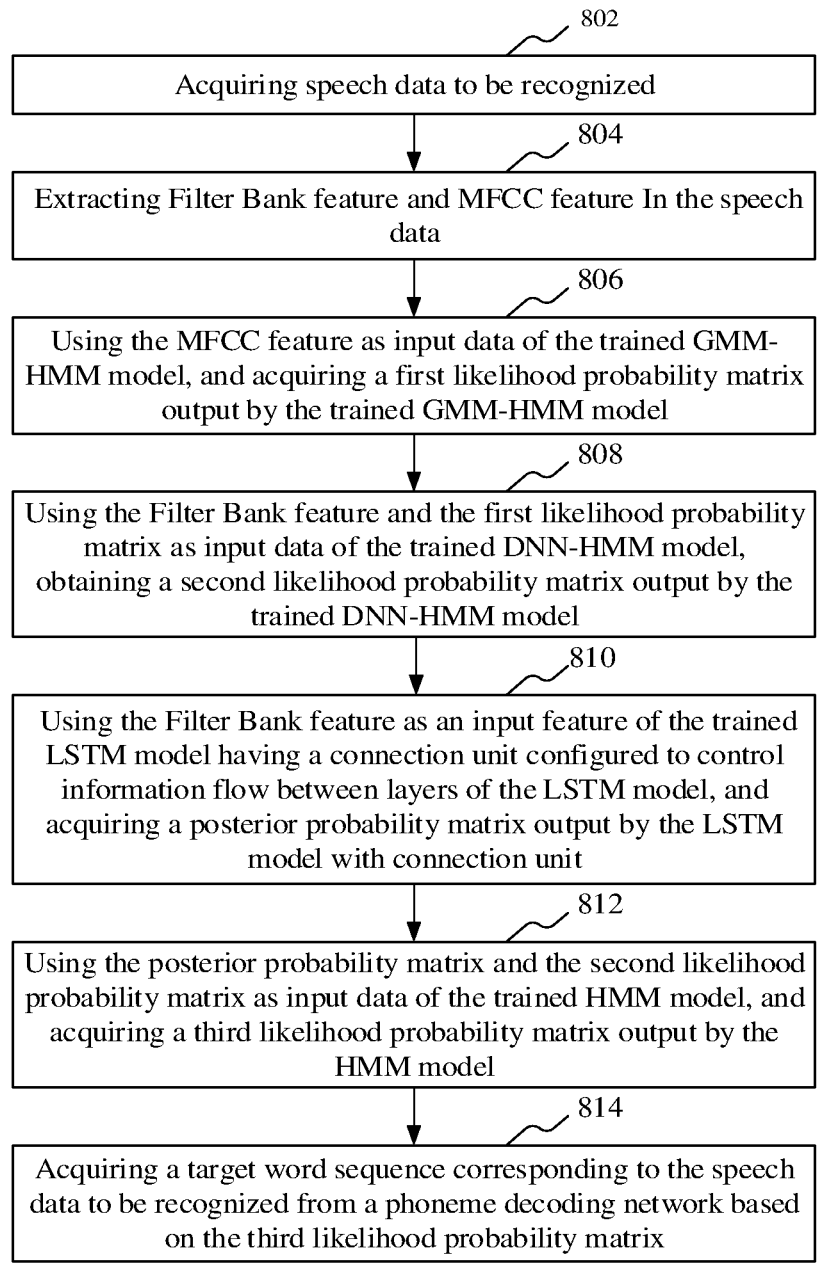
FIG. 8 is a flow diagram illustrating a method for speech recognition according to another embodiment.

As shown in FIG. 8, in one embodiment, a method for speech recognition is provided. The method includes the following steps.

At step 802, the speech data to be recognized is acquired.

At step 804, a Filter Bank feature and a MFCC feature are extracted in the speech data, At step 806, the MFCC feature is used as input data of a trained GMM-HMM model, and a first likelihood probability matrix output by the trained GMM-HMM model is acquired.

At step 808, the Filter Bank feature and the first likelihood probability matrix are used as input data of a trained DNN-HMM model, and a second likelihood probability matrix output by the trained DNN-HMM model is acquired.

At step 810, the Filter Bank feature is used as an input feature of a trained LSTM model having a connection unit configured to control information flow between layers of the LSTM model, and a posterior probability matrix output by the LSTM model having the connection unit is acquired.

At step 812, the posterior probability matrix and the second likelihood probability matrix are used as input data of a trained HMM model, and a third likelihood probability matrix output by the HMM model is acquired.

At step 814, a target word sequence corresponding to the speech data to be recognized is acquired from the phoneme decoding network, based on the third likelihood probability matrix.

In this embodiment, in order to obtain a more accurate recognition effect, after the preliminary alignment result (the first likelihood probability matrix) obtained by the trained GMM-HMM model, it can archive a better alignment effect after a further alignment performed by the trained DNN-HMM model. Because the deep neural network model obtains better speech feature expression than the traditional mixed Gaussian model, it improves the accuracy by using the deep neural network model for further forced alignment. Then the result of this further alignment (the second likelihood probability matrix) is substituted into an innovative LSTM-HMM model having the connection unit, and the final alignment result (the third likelihood probability matrix) is obtained. It should be noted that the alignment result herein refers to an alignment relationship between speech frame and phoneme state. Whether the mixed Gaussian model or the deep learning model mentioned above is a part of the acoustic model, and the function of the acoustic model is to obtain the alignment relationship between the speech frame and the phoneme state, so as to acquire a target word sequence corresponding to the speech data to be recognized in the phoneme decoding network, combining with the language model.

Figure 9:
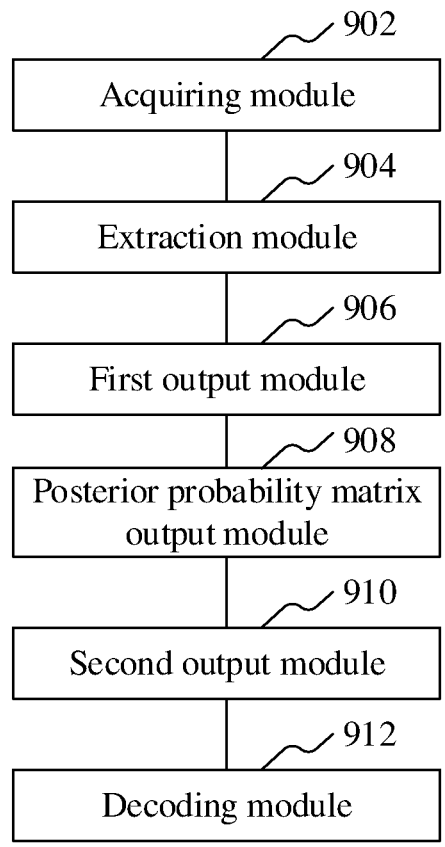
FIG. 9 is a block diagram illustrating an apparatus for speech recognition according to one embodiment.

As shown in FIG. 9, in one embodiment, a apparatus for speech recognition is provided. The apparatus includes:

an acquiring module 902, configured to acquire the speech data to be recognized;

an extraction module 904, configured to extract a Filter Bank feature and a MFCC feature in the speech data;

a first output module 906, configured to use the MFCC feature as input data of a trained GMM-HMM model, and acquire the first likelihood probability matrix output by the trained GMM-HMM model;

a posterior probability matrix output module 908, configured to use the Filter Bank feature as an input feature of a trained LSTM model having a connection unit configured to control information flow between layers of the LSTM model, and acquire the posterior probability matrix output by the LSTM model having the connection unit.

a second output module 910, configured to use the posterior probability matrix and the first likelihood probability matrix as input data of a trained HMM model, and acquire the second likelihood probability matrix output by the trained HMM model; and a decoding module 912, configured to acquire a target word sequence corresponding to the speech data to be recognized from the phoneme decoding network based on the second likelihood probability matrix.

In one embodiment, the extraction module is further configured to convert the speech data to be recognized into an energy spectrum in frequency domain by Fourier transformation, use the energy spectrum in frequency domain as an input feature of a Mel-scale triangular filter bank, calculate a Filter Bank feature of the speech data to be recognized, and obtain the MFCC feature of the speech data to be recognized by performing discrete cosine transformation on the Filter Bank feature.

In one embodiment, the connection unit is implemented by a sigmoid function. The posterior probability matrix output module 908 is further configured to: use the Filter Bank as the input feature of the trained LSTM model having the connection unit; determine a sigmoid function value corresponding to the connection unit between the layers based on a state and an output of a previous layer of neural nodes and an input of a latter layer of neural nodes in the LSTM model; and output a posterior probability matrix corresponding to the Filter Bank feature based on the sigmoid function value corresponding to the connection unit between the layers.

Figure 10:
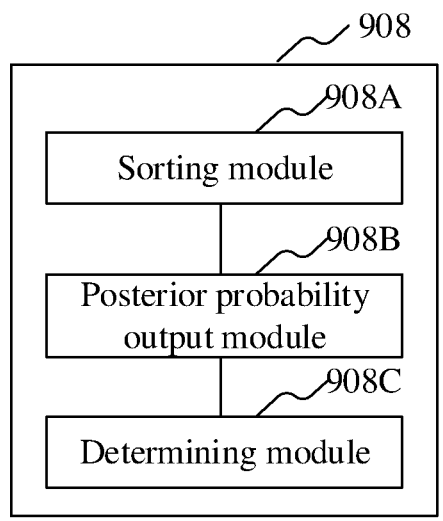
FIG. 10 is a block diagram illustrating a configuration of a posterior probability matrix output module according to one embodiment.

As shown in FIG. 10, in one embodiment, the posterior probability matrix output module 908 includes:

a sorting module 908A, configured to acquire a Filter Bank feature corresponding to each frame of speech data respectively in the speech data to be recognized, and sort the Filter Bank feature corresponding to each frame of speech data in chronological order;

a posterior probability output module 908B, configured to use the Filter Bank feature of each frame of speech data and Filter Bank features of a set number of frames before and after each frame of speech data as the input feature of the trained LSTM model having the connection unit, and acquire an output posterior probability corresponding to each frame of speech data output in a phoneme state by controlling the information flow between the layers with the connection unit; and a determining module 908C, configured to determine a posterior probability matrix corresponding to the speech data to be recognized based on the posterior probability corresponding to each frame of speech data.

Figure 11:
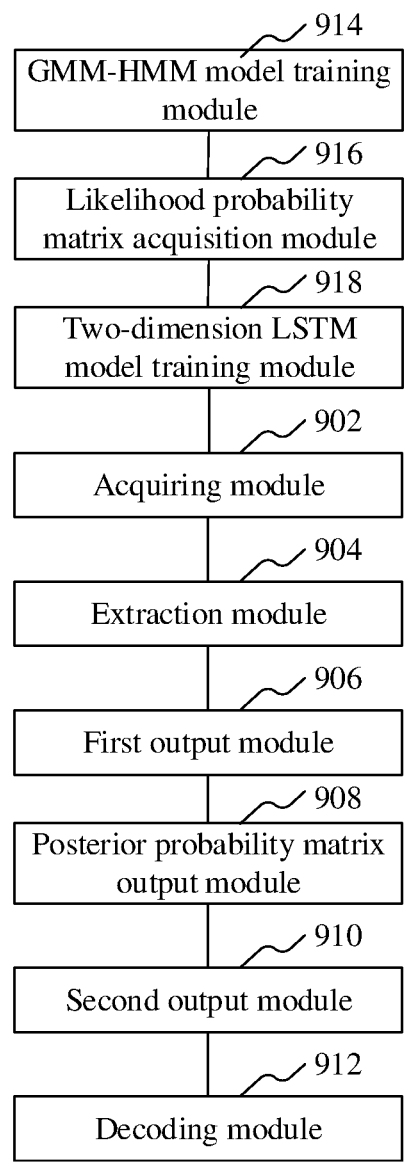
FIG. 11 is a block diagram illustrating a configuration of an apparatus for speech recognition according to another embodiment.

As shown in FIG. 11, in one embodiment, the above apparatus for speech recognition further includes:

a GMM-HMM model training module 914, configured to train the GMM-HMM model with a training corpus, determine a variance and a mean value corresponding to the GMM-HMM module by continuous iterative training, and generate the trained GMM-HMM model based on the variance and mean value;

a likelihood probability matrix acquisition module 916, configured to acquire a likelihood probability matrix corresponding to the training corpus with the trained GMM-HMM model, based on the MFCC feature extracted from the training corpus; and a LSTM model training module 918, configured to train the LSTM model having the connection unit based on the Filter Bank feature and the likelihood probability matrix extracted from the training corpus, determine the weight matrix and bias matrix corresponding to the LSTM model having the connection unit, and generate the trained LSTM model having the connection unit based on the weight matrix and bias matrix.

Figure 12:
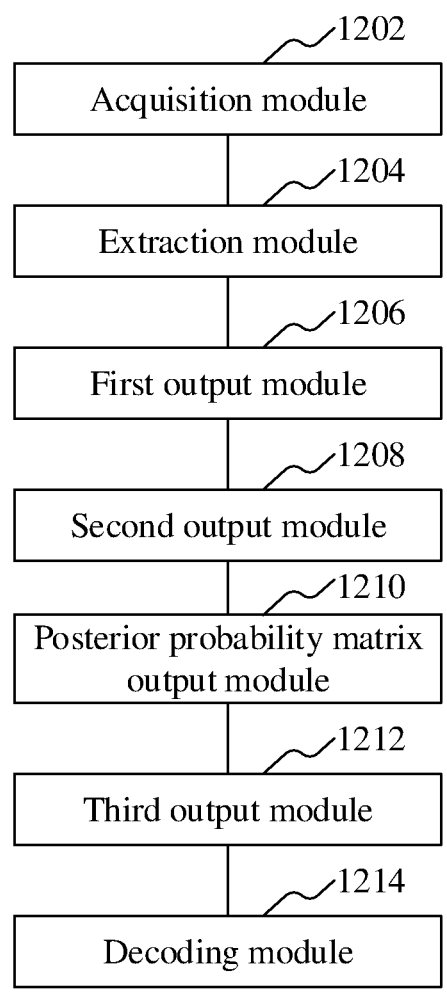
FIG. 12 is a block diagram illustrating a configuration of an apparatus for speech recognition according to a further embodiment.

As shown in FIG. 12, in one embodiment, an apparatus for speech recognition is provided. The apparatus include:

an acquisition module 1202, configured to acquire speech data to be recognized;

an extraction module 1204, configured to extract a Filter Bank feature and a MFCC feature in the speech data;

a first output module 1206, configured to use the MFCC feature as input data of the trained GMM-HMM model, and acquire the first likelihood probability matrix output by the trained GMM-HMM model.

a second output module 1208, configured to use the Filter Bank feature and the first likelihood probability as input data of a trained DNN-HMM module, and acquire a second likelihood probability matrix output by the trained DNN-HMM model;

a posterior probability matrix output module 1210, configured to use the Filter Bank features as input feature of the trained LSTM model having a connection unit configured to control information flow between layers of the LSTM model, and acquire the posterior probability matrix output by the LSTM model having the connection unit;

a third output module 1212, configured to use the posterior probability matrix and the second likelihood probability matrix as input data of the trained HMM model, and acquire the third likelihood probability matrix output by the trained HMM model; and a decoding module 1214, configured to acquire a target word sequence corresponding to the speech data to be recognized in a phoneme decoding network, based on the third likelihood probability matrix.

Every module of the above-described apparatus for speech recognition may be realized in whole or in part by software, hardware, and the combinations thereof. The network interface may be an Ethernet card or a wireless card. Each of the above-mentioned modules may be embedded in or independent of the processor in the server in the form of hardware, or may be stored in the memory in the server in the form of the software, so that the processor may call and execute the operation corresponding to the above respective modules. The processor may be a Central Processing Unit (CPU), a Microprocessor, a Microcontroller, or the like.

The above-described apparatus for speech recognition may be implemented in the form of a computer program that can be operated on a computing device as shown in FIG. 1.

In one embodiment, a computing device is provided. The internal configuration of the computing device may correspond to the configuration shown in FIG. 1, that is, the computing device may be a server or a terminal, which includes a memory, a processor, and a computer program stored in the memory and operable to be executed by the processor. When the processor executes the computer program, the following steps are performed: acquiring speech data to be recognized; extracting a Filter Bank feature and a MFCC feature in the speech data; using the MFCC feature as input data of a trained GMM-HMM model, and acquire a first likelihood probability matrix output by the trained GMM-HMM model; using the Filter Bank feature as an input feature of a trained LSTM model having a connection unit configured to control information flow between layers of the LSTM model, and acquiring a posterior probability matrix output by the LSTM model having the connection unit; using the posterior probability matrix and the first likelihood probability matrix as input data of a trained HMM model, and acquiring a second likelihood probability matrix output by the trained HMM model; and acquiring a target word sequence corresponding to the speech data to be recognized from a phoneme decoding network based on the second likelihood probability matrix.

In one embodiment, the connection unit is implemented by a sigmoid function. The using the Filter Bank feature as the input feature of the trained LSTM model having the connection unit configured to control the information flow between the layers of the LSTM model, and acquiring the posterior probability matrix output by the LSTM model having the connection unit implemented by the processor includes: using the Filter Bank feature as the input feature of the trained LSTM model having the connection unit; determining a sigmoid function value corresponding to the connection unit between the layers based on a state and an output of a previous layer of neural nodes and an input of a latter layer of neural nodes in the LSTM model; and outputting a posterior probability matrix corresponding to the Filter Bank feature based on the sigmoid function value corresponding to the connection unit between the layers.

In one embodiment, the extracting the Filter Bank feature and the MFCC feature of the speech data implemented by the processor includes: converting the speech data to be recognized into an energy spectrum in a frequency domain by Fourier transformation; using the energy spectrum in the frequency domain as an input feature of a Mel-scale triangular filter bank, and to calculating the Filter Bank feature of the speech data to be recognized; and obtaining the MFCC feature of the speech data to be recognized by performing discrete cosine transformation on the Filter Bank feature.

In one embodiment, the using the Filter Bank feature as the input feature of the trained LSTM model having the connection unit configured to control the information flow between the layers of the LSTM model, and acquiring the posterior probability matrix output by the LSTM model having the connection unit implemented by the processor includes: acquiring a Filter Bank feature corresponding to each frame of speech data respectively in the speech data to be recognized, and sorting the Filter Bank feature corresponding to each frame of speech data in chronological order; using the Filter Bank feature of each frame of speech data and Filter Bank features of a set number of frames before and after each frame of speech data as the input feature of the trained LSTM model having the connection unit, and acquiring an output posterior probability corresponding to each frame of speech data in a phoneme state by controlling the information flow between the layers with the connection unit; and determining a posterior probability matrix corresponding to the speech data to be recognized based on the posterior probability corresponding to each frame of speech data.

In one embodiment, before acquiring the speech data to be recognized, when the computer program is executed by the processor, the processor is further caused to implement: training the GMM-HMM model with a training corpus, and determining a variance and a mean value corresponding to the GMM-HMM model by continuous iterative training; generating the trained GMM-HMM model based on the variance and the mean value; acquiring a likelihood probability matrix corresponding to the training corpus with the trained GMM-HMM model, based on the MFCC feature extracted from the training corpus; training the LSTM model having the connection unit based on the Filter Bank feature extracted from the training corpus and the likelihood probability matrix, and determining a weight matrix and a bias matrix corresponding to the LSTM model having the connection unit; and generating the trained LSTM model having the connection unit based on the weight matrix and bias matrix.

In one embodiment, a computer-readable storage medium is provided, on which computer instructions are stored. When a processor executes the instructions, the following steps are performed: acquiring speech data to be recognized; extracting a Filter Bank feature and a MFCC feature in the speech data; using the MFCC feature as input data of a trained GMM-HMM model, and acquiring a first likelihood probability matrix output by the trained GMM-HMM model; using the Filter Bank feature as input data of a trained LSTM model having the connection unit configured to control the information flow between the layers of the LSTM model, and acquiring a posterior probability matrix output by the LSTM model having the connection unit; using the posterior probability matrix and the first likelihood probability matrix as input data of a trained HMM model, and acquiring a second likelihood probability matrix output by the trained HMM model; and acquiring a target word sequence corresponding to the speech data to be recognized in a phoneme decoding network based on the second likelihood probability matrix.

In one embodiment, the connection unit is implemented by a sigmoid function. The using the Filter Bank feature as the input feature of the trained LSTM model having the connection unit configured to control the information flow between the layers of the LSTM model, and acquiring the posterior probability matrix output by the LSTM model having the connection unit implemented by the processor includes: using the Filter Bank feature as the input feature of the trained LSTM model having the connection unit; determining a sigmoid function value corresponding to the connection unit between the layers based on a state and an output of a previous layer of neural nodes and an input of a latter layer of neural nodes in the LSTM model; and outputting a posterior probability matrix corresponding to the Filter Bank feature based on the sigmoid function value corresponding to the connection unit between the layers.

In one embodiment, the extracting the Filter Bank feature and the MFCC feature of the speech data implemented by the processor includes: converting the speech data to be recognized into an energy spectrum in a frequency domain by Fourier transformation; using the energy spectrum in the frequency domain as an input feature of a Mel-scale triangular filter bank, and calculating the Filter Bank feature of the speech data to be recognized; and obtaining the MFCC feature of the speech data to be recognized by performing discrete cosine transformation of the Filter Bank feature.

In one embodiment, the using the Filter Bank feature as the input feature of the trained LSTM model having the connection unit configured to control the information flow between the layers of the LSTM model, and acquiring the posterior probability matrix output by the LSTM model having the connection unit implemented by the processor includes: acquiring a Filter Bank feature corresponding to each frame of speech data respectively in the speech data to be recognized, and sorting the Filter Bank feature corresponding to each frame of speech data chronological order; using the Filter Bank features of each frame of speech data and Filter Bank features of a set number of frames before and after each frame of speech data as the input feature of the trained LSTM model having the connection unit, and acquiring an output posterior probability corresponding to each frame of speech data in a phoneme state by the controlling the information flow between the layers with the connection unit; and determining a posterior probability matrix corresponding to the speech data to be recognized based on the posterior probability corresponding to each frame of speech data.

In one embodiment, before acquiring speech data to be recognized, when the readable instructions are executed by the processor, the processor is further caused to implement: training the GMM-HMM model with a training corpus, and determining a variance and a mean value corresponding to the GMM-HMM model by continuous iterative training; generating the trained GMM-HMM model based on the variance and the mean value; acquiring a likelihood probability matrix corresponding to the training corpus with trained GMM-HMM model, based on the MFCC feature extracted from the training corpus; training the LSTM model having the connection unit based on the Filter Bank feature extracted from the training corpus and the likelihood probability matrix, and determining a weight matrix and a bias matrix corresponding to the LSTM model having the connection unit; and generating the trained LSTM model having the connection unit based on the weight matrix and the bias matrix.

A person skilled in the art should understand that the processes of the methods in the above embodiments can be, in full or in part, implemented by computer program instructing underlying hardware. The computer program can be stored in a computer-readable storage medium. The computer program can include the processes in the embodiments of the various methods when it is being executed. The above mentioned storage medium can be non-transitory storage medium, such as disk, CD, Read-Only Memory (ROM), etc.

A person skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for speech recognition, the method comprising:
   acquiring speech data to be recognized;
   extracting a Filter Bank feature and a Mel-Frequency Cepstral Coefficient (MFCC)feature in the speech data;
   using the MFCC feature as input data of a trained Gaussian Mixture Model-Hidden Markov Model (GMM-HMM) model, and acquiring a first likelihood probability matrix output by the trained GMM-HMM model;
   using the Filter Bank feature as an input feature of a trained long short-term memory (LSTM) model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

2. The method according to claim 1, wherein the connection unit is implemented by a sigmoid function, and wherein using the Filter Bank feature as the input feature of the trained LSTM model having the connection unit configured to control the information flow between the layers of the LSTM model, and acquiring the posterior probability matrix output by the LSTM model having the connection unit comprises:

using the Filter Bank feature as the input feature of the trained LSTM model having the connection unit;
determining a sigmoid function value corresponding to the connection unit between the layers based on a state and an output of a previous layer of neural nodes and an input of a latter layer of neural nodes in the LSTM model; and
outputting a posterior probability matrix corresponding to the Filter Bank feature based on the sigmoid function value corresponding to the connection unit between the layers.

3. The method according to claim 1, wherein extracting the Filter Bank feature and the MFCC feature in the speech data comprises:

converting the speech data to be recognized into an energy spectrum in frequency domain by Fourier transformation;
using the energy spectrum in frequency domain as an input feature of a Mel-scale triangular filter bank, and calculating a Filter Bank feature of the speech data to be recognized; and
obtaining the MFCC feature of the speech data to be recognized by performing discrete cosine transformation on the Filter Bank feature.

4. The method according to claim 1, wherein using the Filter Bank feature as the input feature of the trained LSTM model having the connection unit configured to control the information flow between the layers of the LSTM model, and acquiring the posterior probability matrix output by the LSTM model having the connection unit comprises:

acquiring a Filter Bank feature corresponding to each frame of speech data respectively in the speech data to be recognized, and sorting the Filter Bank feature corresponding to each frame of speech data in chronological order;
using the Filter Bank feature of each frame of speech data and Filter Bank features of a set number of frames before and after the each frame of speech data as the input feature of the trained LSTM model having the connection unit, and acquiring an output posterior probability corresponding to each frame of speech data in a phoneme state by controlling the information flow between the layers with the connection unit; and
determining a posterior probability matrix corresponding to the speech data to be recognized based on the posterior probability corresponding to each frame of speech data.

5. The method according to claim 1, before acquiring the speech data to be recognized, further comprising:

training the GMM-HMM model with a training corpus, and determining a variance and a mean value corresponding to the GMM-HMM model by continuous iterative training;
generating the trained GMM-HMM model based on the variance and the mean value;
acquiring a likelihood probability matrix corresponding to the training corpus with the trained GMM-HMM model, based on the MFCC feature extracted from the training corpus;
training the LSTM model having the connection unit based on the Filter Bank feature extracted from the training corpus and the likelihood probability matrix, and determining a weight matrix and a bias matrix corresponding to the LSTM model having the connection unit; and
generating the trained LSTM model having the connection unit based on the weight matrix and the bias matrix.

6. A computing device, comprising:

a processor; and
a memory storing computer-readable instructions operable to be executed by the processor to cause the processor to perform a method including:
acquiring speech data to be recognized;
extracting a Filter Bank feature and a Mel-Frequency Cepstral Coefficient (MFCC) feature in the speech data;
using the MFCC feature as input data of a trained Gaussian Mixture Model-Hidden Markov Model (GMM-HMM) model, and acquire a first likelihood probability matrix output by the trained GMM-HMM model;
using the Filter Bank feature as an input feature of a trained long short-term memory (LSTM) model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

7. The computing device according to claim 6, wherein the connection unit is implemented by a sigmoid function, and wherein the using the Filter Bank feature as the input feature of the trained LSTM model having the connection unit configured to control the information flow between the layers of the LSTM model, and acquiring the posterior probability matrix output by the LSTM model having the connection unit performed by the processor comprises:

using the Filter Bank feature as the input feature of the trained LSTM model having the connection unit;
determining a sigmoid function value corresponding to the connection unit between the layers based on a state and an output of a previous layer of neural nodes and an input of a latter layer of neural nodes in the LSTM model; and
outputting a posterior probability matrix corresponding to the Filter Bank feature based on the sigmoid function value corresponding to the connection unit between the layers.

8. The computing device according to claim 6, wherein the extracting the Filter Bank feature and the MFCC feature of the speech data performed by the processor comprises:
converting the speech data to be recognized into an energy spectrum in frequency domain by Fourier transformation;
using the energy spectrum in frequency domain as an input feature of a Mel-scale triangular filter bank, and to calculating the Filter Bank feature of the speech data to be recognized; and
obtaining the MFCC feature of the speech data to be recognized by performing discrete cosine transformation on the Filter Bank feature.

9. The computing device according to claim 6, wherein the using the Filter Bank feature as the input feature of the trained LSTM model having the connection unit configured to control the information flow between the layers of the LSTM model, and acquiring the posterior probability matrix output by the LSTM model having the connection unit performed by the processor comprises:
acquiring a Filter Bank feature corresponding to each frame of speech data respectively in the speech data to be recognized, and sorting the Filter Bank feature corresponding to each frame of speech data in chronological order;
using the Filter Bank feature of each frame of speech data and Filter Bank features of a set number of frames before and after each frame of speech data as the input feature of the trained LSTM model having the connection unit, and acquiring an output posterior probability corresponding to each frame of speech data in a phoneme state by controlling the information flow between the layers with the connection unit; and
determining a posterior probability matrix corresponding to the speech data to be recognized based on the posterior probability corresponding to each frame of speech data.

10. The computing device according to claim 6, wherein before acquiring the speech data to be recognized, when the readable instructions are executed by the processor, the processor is further caused to perform:
training the GMM-HMM model with a training corpus, and determining a variance and a mean value corresponding to the GMM-HMM model by continuous iterative training;
generating the trained GMM-HMM model based on the variance and the mean value;
acquiring a likelihood probability matrix corresponding to the training corpus with the trained GMM-HMM model, based on the MFCC feature extracted from the training corpus;
training the LSTM model having the connection unit based on the Filter Bank feature extracted from the training corpus and the likelihood probability matrix, and determining a weight matrix and a bias matrix corresponding to the LSTM model having the connection unit; and
generating the trained LSTM model having the connection unit based on the weight matrix and bias matrix.

11. One or more non-transitory readable storage mediums storing computer readable instructions operable to be executed by one or more processors to cause the one or more processors to perform a method comprising:
acquiring speech data to be recognized;
extracting a Filter Bank feature and a Mel-Frequency Cepstral Coefficient (MFCC) feature in the speech data;
using the MFCC feature as input data of a trained Gaussian Mixture Model-Hidden Markov Model (GMM-HMM) model, and acquiring a first likelihood probability matrix output by the trained GMM-HMM model;
using the Filter Bank feature as an input feature of a trained long short-term memory (LSTM) model having a connection unit configured to control information flow between layers of the LSTM model, and acquiring a posterior probability matrix output by the LSTM model having the connection unit;
using the posterior probability matrix and the first likelihood probability matrix as input data of a trained HMM model, and acquiring a second likelihood probability matrix output by the trained HMM model; and
acquiring a target word sequence corresponding to the speech data to be recognized from a phoneme decoding network based on the second likelihood probability matrix.

12. The storage medium according to claim 11, wherein the connection unit is implemented by a sigmoid function, and the using the Filter Bank feature as the input feature of the trained LSTM model having the connection unit configured to control the information flow between the layers of the LSTM model, and acquiring the posterior probability matrix output by the LSTM model having the connection unit performed by the processor comprises:
using the Filter Bank feature as the input feature of the trained LSTM model having the connection unit;
determining a sigmoid function value corresponding to the connection unit between the layers based on a state and an output of a previous layer of neural nodes and an input of a latter layer of neural nodes in the LSTM model; and
outputting a posterior probability matrix corresponding to the Filter Bank feature based on the sigmoid function value corresponding to the connection unit between the layers.

13. The storage medium according to claim 11, wherein, the extracting the Filter Bank feature and the MFCC feature of the speech data performed by the processor comprises:
converting the speech data to be recognized into an energy spectrum in frequency domain by Fourier transformation;
using the energy spectrum in frequency domain as an input feature of a Mel-scale triangular filter bank, and calculating the Filter Bank feature of the speech data to be recognized; and
obtaining the MFCC feature of the speech data to be recognized by performing discrete cosine transformation of the Filter Bank feature.

14. The storage medium according to claim 11, wherein the using the Filter Bank feature as the input feature of the trained LSTM model having the connection unit configured to control the information flow between the layers of the LSTM model, and acquiring the posterior probability matrix output by the LSTM model having the connection unit performed by the processor comprises:
acquiring a Filter Bank feature corresponding to each frame of speech data respectively in the speech data to be recognized, and sorting the Filter Bank feature corresponding to each frame of speech data chronological order;
using the Filter Bank features of each frame of speech data and Filter Bank features of a set number of frames before and after each frame of speech data as the input feature of the trained LSTM model having the connection unit, and acquiring an output posterior probability corresponding to each frame of speech data in a phoneme state by the controlling the information flow between the layers with the connection unit; and determining a posterior probability matrix corresponding to the speech data to be recognized based on the posterior probability corresponding to each frame of speech data.

15. The storage medium according to claim 11, wherein before acquiring speech data to be recognized, when the readable instructions are executed by the processor, the processor is further caused to perform:

training the GMM-HMM model with a training corpus, and determining a variance and a mean value corresponding to the GMM-HMM model by continuous iterative training;

generating the trained GMM-HMM model based on the variance and the mean value;

acquiring a likelihood probability matrix corresponding to the training corpus with trained GMM-HMM model, based on the MFCC feature extracted from the training corpus;

training the LSTM model having the connection unit based on the Filter Bank feature extracted from the training corpus and the likelihood probability matrix, and determining a weight matrix and a bias matrix corresponding to the LSTM model having the connection unit; and generating the trained LSTM model having the connection unit based on the weight matrix and the bias matrix.

* * * * *